(12) United States Patent
Paul et al.

(10) Patent No.: US 10,790,725 B2
(45) Date of Patent: Sep. 29, 2020

(54) ASSEMBLED HOLLOW ROTOR SHAFT HAVING A COOLING-MEDIUM DISTRIBUTION ELEMENT

(71) Applicants: THYSSENKRUPP PRESTA TECCENTER AG, Eschen (LI); thyssenkrupp AG, Essen (DE)

(72) Inventors: Daniel Paul, Burkhardtsdorf (DE); Christian Kötschau, Chemnitz (DE); Sebastian Wappler, Chemnitz (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 79 days.

(21) Appl. No.: 15/778,181

(22) PCT Filed: Nov. 17, 2016

(86) PCT No.: PCT/EP2016/077925
§ 371 (c)(1),
(2) Date: May 22, 2018

(87) PCT Pub. No.: WO2017/093026
PCT Pub. Date: Jun. 8, 2017

(65) Prior Publication Data
US 2018/0358867 A1 Dec. 13, 2018

(30) Foreign Application Priority Data
Nov. 30, 2015 (DE) .......................... 10 2015 223 631

(51) Int. Cl.
*H02K 9/19* (2006.01)
*H02K 9/00* (2006.01)
(Continued)

(52) U.S. Cl.
CPC ............. *H02K 9/005* (2013.01); *H02K 7/003* (2013.01); *H02K 9/19* (2013.01); *H02K 19/02* (2013.01)

(58) Field of Classification Search
CPC .... H02K 9/005; H02K 9/16–197; H02K 1/32; H02K 5/20; H02K 7/02;
(Continued)

(56) References Cited

U.S. PATENT DOCUMENTS

| 3,809,933 A | 5/1974 | Sugawara |
| 4,203,044 A * | 5/1980 | Linscott, Jr. ............. F16C 3/00 310/61 |

(Continued)

FOREIGN PATENT DOCUMENTS

| CH | 337267 A | 3/1959 |
| CN | 105099079 A | 11/2015 |

(Continued)

OTHER PUBLICATIONS

DE102017214560 English Translation.*
English Translation of International Search Report issued in PCT/EP2016/077925, dated Jan. 18, 2017 (dated Jan. 30, 2017).

*Primary Examiner* — Maged M Almawri
(74) *Attorney, Agent, or Firm* — thyssenkrupp North America, LLC (57) ABSTRACT

An assembled hollow rotor shaft for a rotor, which rotates about a longitudinal axis, of an electric machine, may include a cylinder jacket that surrounds a shaft cavity, and end flanges disposed on both sides on the cylinder jacket. A shaft journal is disposed on each of the end flanges. An inlet is provided in the shaft journal of one of the end flanges via which a cooling medium can be conducted into the shaft cavity and onto an inner surface of the cylinder jacket. A cooling-medium distribution element within the shaft cavity may be formed symmetrically perpendicularly to the longi- (Continued)

tudinal axis, may receive the cooling medium, which enters via the inlet, via a receiving region, may guide the cooling medium via a removal region in a direction of the inner surface of the cylinder jacket, and may discharge the cooling medium onto the inner surface via a discharging region.

12 Claims, 3 Drawing Sheets

(51) Int. Cl.
*H02K 7/00* (2006.01)
*H02K 19/02* (2006.01)

(58) Field of Classification Search
CPC .......... H02K 7/025; H02K 19/02; H02K 9/19; H02K 9/10; H02K 7/003; F16F 15/30; F16F 15/302; Y02E 60/16
USPC .......... 310/74, 54, 57, 63, 64, 153, 216.119, 310/52–62, 58, 59, 61, 60 A
See application file for complete search history.

(56) References Cited

U.S. PATENT DOCUMENTS

| | | | | |
|---|---|---|---|---|
| 6,750,572 B2* | 6/2004 | Tornquist | .................. | H02K 9/19 310/54 |
| 6,897,581 B2* | 5/2005 | Doherty | .................... | H02K 1/24 310/52 |
| 9,154,006 B2* | 10/2015 | Yamamoto | ........... | H02K 1/2766 |
| 9,373,984 B2* | 6/2016 | De Bock | .................. | H02K 1/32 |
| 2009/0261667 A1* | 10/2009 | Matsubara | ................ | H02K 1/32 310/54 |
| 2012/0205996 A1* | 8/2012 | Buttner | ..................... | H02K 9/20 310/54 |
| 2012/0213460 A1* | 8/2012 | Radinger | ................ | H02K 7/116 384/462 |
| 2012/0299404 A1* | 11/2012 | Yamamoto | ................ | H02K 1/32 310/61 |
| 2013/0002064 A1* | 1/2013 | De Bock | ................. | H02K 9/197 310/54 |
| 2013/0257196 A1* | 10/2013 | Yamamoto | ................ | H02K 9/19 310/54 |
| 2013/0334912 A1* | 12/2013 | Tokunaga | ................. | H02K 1/32 310/54 |
| 2014/0124172 A1* | 5/2014 | Veltri | ..................... | F16F 15/302 165/104.19 |
| 2015/0042185 A1* | 2/2015 | Buttner | .................. | H02K 9/197 310/54 |

FOREIGN PATENT DOCUMENTS

| | | | |
|---|---|---|---|
| DE | 2900133 | A | 7/1979 |
| DE | 102017214560 | * | 1/2006 |
| DE | 102013020332 | A | 7/2014 |
| DE | 102014106614 | A | 11/2015 |
| EP | 1892512 | A | 2/2008 |
| JP | 2000-116062 | A | 4/2000 |
| JP | 2001-500353 | A | 1/2001 |
| JP | 2002-51503 | A | 2/2002 |
| JP | 2003-235210 | A | 8/2003 |
| JP | 2011-254580 | A | 12/2011 |
| JP | 2015-047062 | A | 3/2015 |
| KR | 20140011449 | A | 1/2014 |

* cited by examiner

ASSEMBLED HOLLOW ROTOR SHAFT HAVING A COOLING-MEDIUM DISTRIBUTION ELEMENT

CROSS REFERENCE TO RELATED APPLICATIONS

This application is a U.S. National Stage Entry of International Patent Application Serial Number PCT/EP2016/077925, filed Nov. 17, 2016, which claims priority to German Patent Application No. DE 10 2015 223 631.5, filed Nov. 30, 2015, the entire contents of both of which are incorporated herein by reference.

FIELD

The present disclosure generally relates to rotor shafts, including assembled hollow rotor shafts having a cooling-medium distribution element.

BACKGROUND

Fundamentally, assembled rotors for electric machines having laminations which are arranged thereon and which are combined, for example, to form lamination assemblies are known. Said rotors are used, for example, in asynchronous machines or in permanently excited synchronous machines. As is known, electric machines are greatly heated during operation because of the electromagnetic activity in the rotor and also because of the heat transfer taking place to other weight-optimized support components. Heating of the electric machine disadvantageously leads to a reduction in the efficiency thereof. In order to increase the power of an electric machine and in particular to optimize the efficiency thereof, cooling systems are integrated in a known manner. Different concepts of cooling systems, in particular for liquid cooling, are fundamentally known. Said liquid coolings are associated here with a specific rotor design which makes use, for example, of special coolant conducting structures. Other concepts also require a multiplicity of additional components which not only influence the design of the rotor but also that of the entire electric machine and the interface components thereof.

Furthermore, various solutions for conducting and distributing the cooling medium to the heat transfer surface are also considered to be fundamentally known, wherein said solutions can disadvantageously comprise complete conduction of the coolant in channels or bores, said conduction being configured as a forced guide over the entire axial and radial extent. Said forced guides cause a high pressure loss because of the flow resistance, and therefore coolant pumps become necessary, in particular if a flow direction counter to the centrifugal force is included. In addition, the use of said concepts is particularly complicated because of the multiplicity of bores, in particular axial drill holes.

For example, CH 337267 discloses an electric machine with a hollow shaft, in which the entire cavity of the rotor has to be filled with a liquid in order to achieve sufficient interaction of the cooling liquid with the rotor jacket and good transfer of heat. However, it has turned out that a sufficient quantity of heat cannot be removed in this manner. U.S. Pat. No. 3,809,933 A also describes a cooled electric machine. In this case, a cooling medium is conducted via a pipe into the interior of a hollow rotor shaft and is discharged via a funnel onto the inner surface of the cylinder jacket of the hollow rotor shaft. The funnel which rotates together with the hollow rotor shaft is fastened on one side and extends in the direction of the longitudinal axis merely up to half of the hollow rotor shaft. Consequently, different, interconnected, large volumes are available for the cooling medium introduced into the hollow rotor shaft cavity. An axial equalizing flow takes place here which is superimposed on the tangential gas flow in such a manner that the cooling medium is entrained in the region in the vicinity of the wall. Consequently, an unequal distribution of the cooling medium is brought about in that half of the rotor shaft in which the funnel is arranged or formed.

In order to reduce the volume requirement, it is fundamentally known to select small cross sections of the lines provided for the coolant. However, such small through bores scarcely reduce the weight of the hollow rotor shaft to be cooled. In addition, because of the surfaces which are in any case small, the coolant can only be brought to a small extent up to the components to be cooled, in particular to the lamination assembly which heats up especially. The coolant often wets only small surfaces on the heated surface and is not extensively distributed over the entire circumference.

On the other hand, it is possible that, with large line cross sections and cavities in the hollow rotor shaft, not only can a large surface be realized for transmitting heat, but so too can a particularly lightweight construction. However, this is disadvantageous in the case in which the hollow cylinder has to be virtually completely filled with coolant during operation, which increases the requirement for coolant and leads in turn to an increase in the moving mass, which is specifically intended to be avoided by means of the lightweight construction.

In view of fluid mechanics, this can lead to a non-uniform and consequently insufficient cooling of the hollow rotor shaft and consequently of the entire electric motor.

Thus a need exists for an assembled hollow rotor shaft for the rotor of an electric machine, which can be manufactured simply and cost-effectively and which permits extensive and efficient cooling of the rotor. In addition, a need also exists for a corresponding rotor and a corresponding electric machine.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an assembled hollow rotor shaft for a rotor, which rotates about a longitudinal axis, of an electric machine, comprising a cylinder jacket which surrounds a shaft cavity, and end flanges arranged on both sides on the cylinder jacket. A shaft journal may be located on each of the end flanges. An inlet may be provided in one of the end flanges, in particular in the shaft journal thereof, via which a cooling medium can be conducted into the shaft cavity and onto an inner surface of the cylinder jacket.

Features and details which are described in conjunction with the hollow rotor shaft may also apply here in conjunction with the rotor and the electric machine, and vice versa in each case, and therefore, with regard to the disclosure, reference can made reciprocally to individual aspects.

The assembled hollow rotor shaft according to the invention for a rotor, which rotates about a longitudinal axis, of an electric machine comprises a cylinder jacket which surrounds a shaft cavity, and end flanges arranged on both sides on the cylinder jacket, wherein a shaft journal is located on each of the end flanges. An inlet is provided in one of the end flanges, in particular in its shaft journal, via which a cooling medium can be conducted into the shaft cavity and onto an inner surface of the cylinder jacket. A cooling-medium distribution element is arranged within the shaft cavity, said cooling-medium distribution element being formed symmetrically perpendicularly to the axis of rotation and being designed in such a manner that the cooling medium, which enters via the inlet, can be received via a receiving region of the cooling-medium distribution element, can be guided via a removing region of the cooling-medium distribution element in the direction of the inner surface of the cylinder jacket and can be discharged onto the inner surface of the cylinder jacket via a discharging region of the cooling-medium distribution element. It is accordingly advantageous for the cooling-medium distribution element to be arranged in the shaft cavity of the hollow rotor shaft immediately behind the inlet of the hollow rotor shaft and for said cooling-medium distribution element to receive a cooling medium entering via the inlet, to forward and distribute said cooling medium and to release same at a predetermined point into the shaft cavity and to discharge said cooling medium there onto the inner surface of the cylinder jacket.

The removal region of the cooling-medium distribution element, which removal region is advantageously formed rotationally symmetrically, in particular symmetrically with respect to the longitudinal axis, serves here firstly for avoiding imbalances and secondly for conducting or guiding the cooling medium radially outward in the direction of the inner surface of the cylinder jacket and for the uniform distribution of the cooling medium along the entire inner surface of the cylinder jacket. In particular, the symmetrical geometry of the cooling-medium distribution element advantageously permits the uniform and extensive distribution of the cooling medium, which is present, for example, in the form of a liquid or gaseous fluid, on account of the flow behavior, which is known from fluid mechanics, of moving fluids along stationary or non-moving walls, or of non-moving or stationary fluids on moving walls. This means that a fluid which has been set into motion, on striking against a stationary wall—such as, for example, the stationary cylinder jacket—does not have any speed and consequently does not have any flow behavior on said wall because of the static friction forces occurring on the wall surface. Accordingly, the movement of the moving fluid is braked by the wall. The speed and accordingly the flow behavior of the fluid occurs and increases with increasing distance of the moving fluid from the stationary wall because of the decreasing static friction force. When the reverse case is present, i.e. the wall which is to be cooled is in movement, for example in rotational movement about a corresponding axis of rotation, and the fluid does not have any speed, a speed is initiated in the fluid, that is to say the fluid is entrained, in the region in the vicinity of the wall because of the static friction forces which occur. In view of fluid mechanics, in the case of a hollow rotor shaft of a rotor, which is to be cooled, of an electric machine, the system will accordingly be striving to set an equilibrium and consequently to equalize different speed gradients—moving wall of the hollow rotor shaft and a fluid set into motion on account of being introduced into the shaft cavity. The cooling medium is advantageously entrained on all components arranged within the shaft cavity, such as, in particular, the cooling-medium distribution element. Accordingly, the cooling medium is set into motion along the inner surface of the cylinder jacket in the same manner as on the surface of the cooling-medium distribution element. Accordingly, with an equalized wall distribution within the shaft cavity, which is made possible in particular by means of the construction of the cooling-medium distribution element in a manner which is rotationally symmetrical and symmetrical with respect to the longitudinal axis, the cooling medium is uniformly distributed along the inner surface of the cylinder jacket of the rotor hollow shaft—at least as viewed in the direction of the longitudinal axis—and accordingly said inner surface is uniformly wetted. The removal region is advantageously manufactured from a thin-walled material, in particular from a plastics material or from a metal sheet.

So that the cooling medium is also uniformly distributed along the inner surface of the cylinder jacket in the circumferential direction of the hollow rotor shaft, use is advantageously made of the discharging region. The discharging region of the cooling-medium distribution element serves for discharging the cooling medium onto the inner surface of the cylinder jacket. The kinetic energy of the rotor and accordingly of the hollow rotor shaft is advantageously used here for transporting the cooling medium. The cooling medium transport, driven by the centrifugal force, thus runs from the rotor axis toward the location of the heat exchange. The discharging of the cooling medium from the shaft cavity advantageously takes place through openings which are provided in the cylinder jacket or in the outer region of the end flanges. Other than complete rinsing of the inner surface, in particular of the cylinder jacket of the hollow rotor shaft, taking place, wetting of the surface to be cooled with the cooing medium is advantageous.

The hollow rotor shaft advantageously comprises a large-volume shaft cavity, wherein, within the context of the invention, a large-volume shaft cavity is considered a cavity in which the ratio of the diameter of the shaft cavity to the diameter of the shaft journal (in particular the diameter of the bearing) is greater than 1.5, advantageously greater than 2.

On account of the lower temperatures, a higher power of the rotor can be achieved, in particular at a defined component limit temperature, thus resulting in an improved power to weight ratio or output volume of the electric machine. With the invention, a lightweight-construction-oriented conception of the rotor is therefore possible with little use of cooling medium and particularly efficient cooling. It is particularly advantageous here for the mass which is to be rotated to remain small despite the cooling medium content.

A particular advantage of the cooling-medium distribution element is that only minor structural modifications have to be made to the assembled rotor or to the assembled hollow rotor shaft in order to realize the cooling concept. The additional cooling-medium distribution element can be connected to the rotor and to the feed lines via simple connection geometry, and therefore a simple cooling system construction with a minimum number of additional components is provided. The invention can be particularly advantageously realized in the case of multi-part, assembled lightweight hollow rotor shafts.

With a small quantity of cooling medium and correspondingly small volume flow, it is advantageous that only so much of the entire shaft cavity is passed through that only the inner surface, which is essential for the heat exchange, of the cylinder jacket of the shaft cavity is wetted. An extensive action of the cooling medium or wetting with the cooling medium already takes place here as the cooling medium strikes against the surface to be cooled. The cooling medium and the direct wetting or action thereof on the wall at the location at which heat arises therefore contribute to an optimum removal of heat despite the small quantity of cooling medium.

On account of the cooled components, the usable power of the entire electric machine is advantageously additionally increased and the influence of the cooling on the acceleration behavior minimized. A further advantage resides in the fact that the cooling, particularly advantageously the liquid cooling, is associated merely with insignificant structural modifications to the rotor and can even be realized as a construction kit solution with a minimal additional outlay.

In an advantageous manner, the cooling-medium distribution element symmetrically divides the shaft cavity. Accordingly, two area segments which are geometrically the same size as each other are produced within the shaft cavity on both sides of the axis of symmetry and, as rotating cross sections, advantageously ensure correspondingly identical speed and pressure ratios of the quantity of air contained in the hollow rotor shaft. An influencing, which is damaging to the equal distribution, of the wall wetting with the cooling medium is thereby effectively avoided. Within the context of the invention, the axis of symmetry extends perpendicularly to the longitudinal axis of the hollow rotor shaft and divides the shaft cavity into two parts of identical size to each other. Consequently, the cooling-medium distribution element particularly advantageously extends symmetrically along the axis of symmetry and also along the longitudinal axis of the hollow rotor shaft.

Within the context of the invention, it is conceivable that the cooling-medium distribution element comprises a spheroidal design. Said spheroidal design is in this case advantageously spherical or egg-shaped. When differently formed dimensions or circumferences of the spheroidally designed cooling-medium distribution element or of the removal region thereof are present, the greatest circumference advantageously extends along the longitudinal axis, i.e. axially.

It is furthermore conceivable that the cooling-medium distribution element extends within the shaft cavity from one of the end flanges as far as the other of the end flanges. The removal region of the cooling-medium distribution element advantageously extends completely within the shaft cavity along the entire length thereof, as viewed in the axial direction. By this means, the movement of the cooling medium along the wall surface of the cylinder jacket is advantageously made possible over the entire length of the cylinder jacket, as viewed in the axial direction. In order to receive the cooling medium and to transport same along the removal region, in particular the inner surface of the removal region, the cooling-medium guide element has a receiving region which advantageously extends at least in sections within one of the end flanges, in particular within or along the inlet within one of the end flanges. The receiving region is introduced into the inlet of the end flange in such a manner that said receiving region also serves at the same time as a bearing in order to mount the cooling-medium guide element at least on the inlet side of the hollow rotor shaft, at which the cooling medium is introduced into the hollow rotor shaft, and advantageously to connect said cooling-medium guide element to the hollow rotor shaft for rotation therewith.

It is possible that the cooling-medium distribution element comprises a mounting region which serves for mounting the cooling-medium distribution element on the end flange which is arranged opposite the end flange which has the inlet. Accordingly, the cooling-medium guide element is advantageously supported or mounted on both sides, in particular on the end flanges of the hollow rotor shaft. By this means, unintentionally occurring imbalances triggered by a disadvantageous mounting of the cooling-mounting distribution element within the shaft cavity, are avoided. In addition, the use of additional elements, for example supporting pins, which can lead to a negative influencing of the distribution of the cooling medium can be avoided. Said mounting also avoids exacting fit tolerances at the inside rotor diameter and at the outside diameter of the removal region of the cooling-medium distribution element, and also too narrow a cross section at the outlet region of the cooling medium, in particular at the discharging region.

It is furthermore conceivable that the discharging region is formed in the center of the axial extent of the removal region. This advantageously leads to the fact that the cooling medium, after striking against the inner surface of the cylinder jacket, is distributed uniformly in both directions—along the longitudinal axis. This means that the cooling medium which is discharged at this point, in particular as the hollow rotor shaft is rotating, is distributed virtually homogeneously to both sides over the inner surface of the cylinder jacket.

It is likewise possible for the discharging region to be formed in the region of the maximum radial extent of the removal region. If the maximum radial extent is formed, for example, eccentrically, as viewed in the radial direction, or if said maximum extent extends over a further region along the axially extending longitudinal axis, the discharging region is accordingly also formed eccentrically, as viewed in the axial direction, in such a manner that said discharging region is at a smaller spacing in relation to one of the two end flanges than in relation to the other of the two end flanges. Such an eccentric arrangement or design of the dispensing region leads by way of example to a defined and certain, in particular intended non-uniform action upon the inner surface of the hollow rotor shaft by means of the cooling medium along the longitudinal axis. In particular, the cooling medium flow increases in that region of the hollow rotor shaft in which the dispensing region is at a smaller distance from the end flange. This is advantageous in particular if, for example, in addition to the cooling of the hollow rotor shaft or of the rotor, a bearing mounting the hollow rotor shaft or part of said bearing is intended to be cooled by means of the introduced cooling medium.

With regard to a good transfer of the cooling medium onto the inner surface of the cylinder jacket and to a uniform distribution of the cooling medium, it is possible for at least the discharging region of the cooling-medium distribution element to be at a small distance from the inner surface of the cylinder jacket.

Adequate discharging of the cooling medium onto the inner surface of the cylinder jacket is required for sufficient cooling of the rotor, and therefore the discharging region has to have an adequate number of passage openings in order to ensure the discharging of the cooling medium from the removal region of the cooling-medium distribution element. For this purpose, the discharging region of the cooling-medium distribution element comprises at least one outlet opening, in particular advantageously a plurality of radial outlet openings which are formed at an equal distance from one another in a manner distributed over the circumference of the cooling-medium distribution element.

In order to avoid an only local or punctiform discharging of the cooling medium onto the inner surface of the cylinder jacket, which leads to an incomplete wetting of the inner surface with the cooling medium, the cooling-medium distribution element advantageously comprises at least one structure on its inner surface for distributing the cooling medium over the entire circumference of the cooling-medium distribution element. A plurality of structures which are used as conducting structures and/or distributing structures formed or arranged on the inner surface of the cooling-medium distribution element, in particular in the removal region of the cooling-medium distribution element, is particularly advantageous. It is possible that said structures are arranged spaced apart at equal distance from one another. However, it is also conceivable for said structures to have an arrangement comprising different distances from one another on the inner surface of the cooling-medium distribution element. With the aid of the at least one structure, an (equal) distribution of the cooling medium over the entire angular extent of the cooling-medium distribution element, in particular about 360°, is advantageously brought about such that the cooling-medium distribution element equally distributes the cooling medium axially and circumferentially along the inner surface of the cylinder jacket of the hollow rotor shaft.

The structure or the structures is or are advantageously of convex design in the direction of the cavity of the cooling-medium distribution element. Accordingly, the at least one structure is consequently not formed with sharp edges.

It is furthermore conceivable that the inlet is formed by a plurality of inlet channels which are equally distributed on the circumference of the shaft journal and open in the receiving region of the cooling-medium distribution element. The cooling medium which is supplied in separate flows via such inlet channels is homogenized by the rotation and the resulting centrifugal force and advantageously also by the structures on the removal surface. Furthermore, in addition to the cooling according to the invention, a further separate transport of media by the rotor can be realized. For said media transport, a leadthrough element, in particular in the form of a pipe section, is provided within the hollow rotor shaft. It is conceivable that the pipe section protrudes through the cavity from one shaft journal to the other, as a result of which a combined arrangement is made possible for the rotor-integrated cooling with separate media transport through the hollow rotor shaft. The two media flows can be introduced and removed separately and therefore can also be switched on and off for different operating states.

The removal of the cooling medium is advantageously possible through openings in the cylinder jacket or in the end flanges. It is particularly advantageous to use the cooling medium located in and to be removed from the shaft cavity, in order to cool the stator coils surrounding the rotor. For this purpose, at least one passage opening, advantageously a plurality of passage openings, is or are provided in the cylinder jacket of the rotor hollow shaft, from which the cooling medium is removed in the radial direction as the hollow rotor shaft is rotating, and wets the surrounding stator. In order to achieve inform wetting, it is advantageous if the passage openings are each arranged in a manner equally distributed over the circumference in the edge regions of the cylinder jacket.

It is likewise conceivable that the passage openings which are formed in an edge region of the cylinder jacket are arranged offset with respect to one another over the circumference in relation to the passage openings which are formed in another edge region of the cylinder jacket. An arrangement of the passage openings on the bisector, as previously described, has the advantage that, when the electric motor is switched off and accordingly when the hollow rotor shaft is stationary, the cooling medium which has accumulated at the lowest region of the hollow rotor shaft due to gravity flows out of the shaft cavity. By this means, the occurrence of imbalances during the starting of the electric motor and consequently of the rotor, in particular the hollow rotor shaft, is advantageously also avoided.

Via the number and the diameter of the individual inlet channels and the number and diameter of the outlet openings distributed radially on the circumference, it is possible to adjust the cooling medium flow and the existing quantity of cooling medium in the rotor and accordingly to control the cooling capacity.

It is conceivable for the rotor to have, on one end side, a cooling medium supply which consists, under some circumstances, of a plurality of feed lines and which is designed as a central axial bore in a component which is part of the hollow rotor shaft. The feed line advantageously opens in the cooling-medium distribution element which begins directly with the radial extension of the hollow-cylindrical region of the hollow rotor shaft. By means of this arrangement, an abrupt and large increase in cross section, as is typical of a lightweight rotor configuration, is bridged. After the cooling medium is transferred to the cooling-medium distribution element, the cooling medium is conducted onto the inner surface of the cylinder jacket of the assembled hollow rotor shaft as a result of the rotation of the rotor and the resulting centrifugal force and the pressure differential between the cooling medium circuit and rotor surroundings. The cooling medium strikes virtually centrally here onto said inner surface. Said central introduction of the cooling medium and the circumferential distribution thereof during the flow section from the inlet of cooling medium to the discharging onto the inner surface are the tasks of the cooling-medium distribution element. On account of the cooling medium flowing in and the centrifugal forces a distribution of the flow subsequently forms and guides the cooling medium axially outward on both sides. The number and diameter of the cooling medium feed lines should be designed here in such a manner that efficient cooling is achieved with as little consumption of energy and volume of the cooling medium as possible. The cooling-medium distribution element is connected here to the feed line element with a force fit, substance-to-substance fit or form fit.

The abrupt increase in cross section within the hollow shaft guarantees a particularly lightweight construction and an enormous increase in the surface available for transmitting heat. It is advantageous that the cooling medium is conducted in a targeted manner onto the inner surface of the cylinder jacket and flows there particularly closely along the active lamination assembly to be cooled. It is advantageous for not the entire shaft cavity to be filled with cooling medium.

Rather, only the inner surface of the cylinder jacket of the hollow rotor shaft is completely acted upon with the cooing medium. The cooling medium is distributed with the aid of the centrifugal force.

By means of the direct transfer of the cooling medium onto the cooling-medium distribution element upon entry into the shaft cavity, a forced guide, reduced to the minimally required extent, of the coolant is achieved. This reduces the pressure losses and the flow resistances. As a result, the use of a coolant pump can be avoided.

Furthermore, a rotor comprising a hollow rotor shaft, which is equipped with lamination assemblies, according to the abovementioned type is claimed. The rotor according to the invention results in all of the advantages which have already been described for a hollow rotor shaft according to the first aspect of the invention.

A further aspect of the invention is an electric machine, in particular an asynchronous motor or a permanently excited synchronous machine which comprises a rotor of the abovementioned type. With the electric machine according to the invention, an increase in the efficiency and the performance thereof is advantageously made possible. Furthermore, it is possible to produce the electric machine in a smaller construction with the driving power required being unchanged. An increase in the usable overload duration is also possible.

Figure 1:
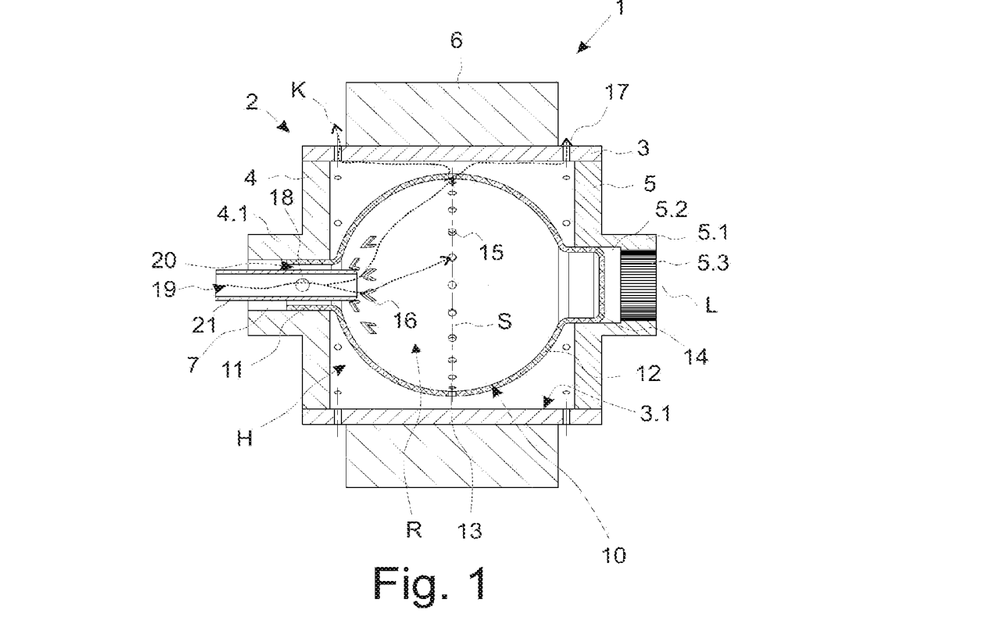
FIG. 1 is a lateral sectional view of an example assembled hollow rotor shaft with a spherical cooling-medium distribution element.

FIG. 1 schematically shows a lateral sectional illustration of an embodiment of an assembled hollow rotor shaft 2 according to the invention with a spherical cooling-medium distribution element 10 or with a spherical removal region 12 of the cooling-medium distribution element 10. The hollow rotor shaft 2 is part of a rotor 1 which comprises a lamination assembly 6 arranged on the hollow rotor shaft 2. The lamination assembly 6 consists in a known manner of a multiplicity of laminations (not illustrated in detail here) which are joined together to form the lamination assembly 6. The hollow rotor shaft 2 has a cylinder jacket 3 and two end flanges 4, 5 which are connected to the cylinder jacket 3 in such a manner that a shaft cavity H which is outwardly closed at least in sections and within which the cooling-medium distribution element 10 is arranged is thereby produced. Each end flange 4, 5 in each case has a shaft journal 4.1 or 5.1 which is usable, for example, at least for the mounting of the rotor 1 or for connecting the rotor 1 to a transmission etc. It is conceivable here that, in a recess, as illustrated by way of example at the reference sign 5.2, a toothing 5.3, in particular an internal toothing is formed, which can enter into interaction with a corresponding external toothing (not shown here) of a component to be arranged.

The cooling-medium distribution element 10, in particular the removal region 12 thereof, is formed spheroidally, in particular spherically, in the embodiment shown in FIG. 1. The cooling-medium distribution element 10 has a receiving region 11, a removal region 12, a discharging region 13 and a bearing region 14. The receiving region 11 serves for receiving a cooling medium K (illustrated schematically as a dashed line) which is introduced into the cavity R of the cooling-medium distribution element 10 via the inlet 7 which is formed in one of the end flanges 4. The receiving region 11 extends in the form of a pipe at least in sections from the removal region 12 into the inlet 7 and consequently at least in sections into the shaft journal 4.1 of the end flange 4 of the hollow rotor shaft 2. The diameter of the receiving region 11 is advantageously smaller than the diameter of the removal region 12 of the cooling-medium distribution element 10. The receiving region 11 advantageously serves as an opening, in particular inlet opening of the cooling-medium distribution element 10. Opposite the receiving region 11, the bearing region 14 is formed adjoining the removal region 12. Accordingly, the removal region 12 is formed between the receiving region 11 and the bearing region 14. The bearing region 14 is advantageously designed as a projection or a protuberance and extends into a cutout 5.2 of the end flange 5 which is arranged on the end side of the cylinder jacket 3 that lies opposite the end side on which the other end flange 4, which comprises an inlet 7, is arranged. The cooling-medium distribution element 10 extends along the longitudinal axis L. The axis of symmetry S which geometrically centrally divides the cooling-medium distribution element 10 is formed perpendicularly to the longitudinal axis L. The cooling-medium distribution element 10 is formed symmetrically with respect to the longitudinal axis L and with respect to the axis of symmetry S. Accordingly, the cooling-medium distribution element 10 is advantageously formed symmetrically with respect to the longitudinal axis and symmetrically with respect to the axis of symmetry. The discharging region 13 of the cooling-medium distribution element 10 extends, in a manner placed on the axis of symmetry S, in the circumferential direction of the cooling-medium distribution element 10. The discharging region 13 has a plurality of outlet openings 15 which are formed at an equal distance from one another in the wall of the cooling-medium distribution element 10 in a manner distributed in the circumferential direction thereof. The outlet openings 15 serve for discharging the cooling medium K from the cavity R of the cooling-medium distribution element 10 into the shaft cavity H, in particular onto the inner surface 3.1 of the cylinder jacket 3 of the hollow rotor shaft 2.

The cooling-medium distribution element 10 is advantageously produced as a blown plastics part, produced from a blow molding blank. The receiving region 11 of the cooling-medium distribution element 10 particularly advantageously serves here as a single inlet opening for introducing the pressure medium in order to expand the blow molding blank into its final form. Structures 16 can also be produced on the inner surface 3.1 of the cooling-medium distribution element 10, in particular the removal region 12 of the cooling-medium distribution element 10, by means of this method.

The structures 16 shown in FIG. 1 serve as conducting structures or distribution structures and are formed on the inner surface of the cooling-medium distribution element 10, in particular the removal region 12. As illustrated by way of example, the structures 16 have a V-shaped design, wherein the V limbs of the respective structures 16 in each case extend in the direction of the discharging region 13.

A pipe section 21 which has an outside diameter which is smaller than the inside diameter of the inlet 7 extends through the inlet 7. This produces inlet channels 19, 20 which are different from each other, wherein the inlet channel 20 produced on the outer circumference of the pipe section 21 has a smaller flow cross section than the inlet channel 19 which is formed by means of the pipe passage of the pipe section 21. It is possible for the pipe section 21 to have a radial opening 18 through which the cooling medium K passes out of the one inlet channel 19 into the other inlet channel 20.

Figure 2:
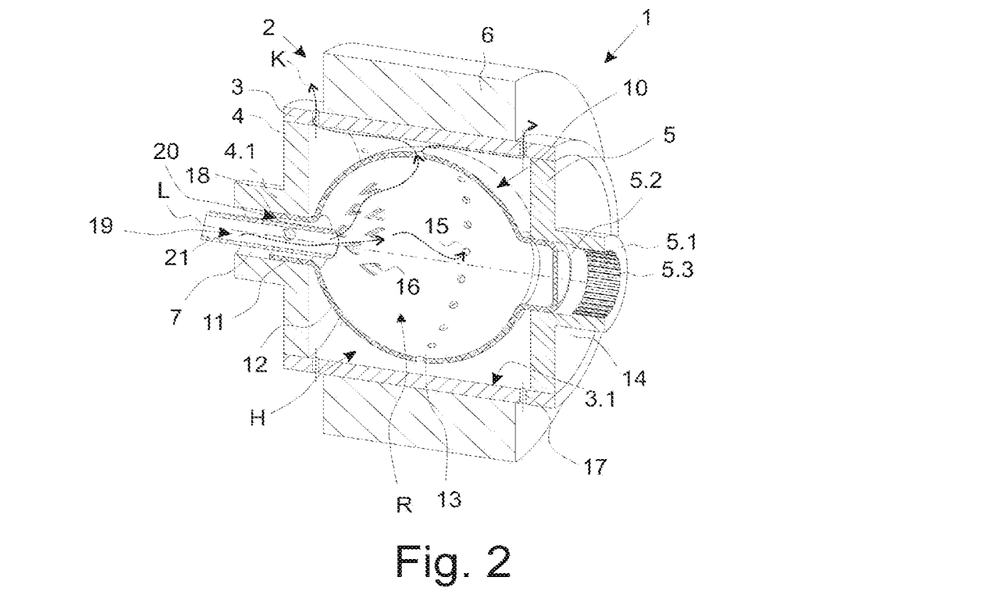
FIG. 2 is a perspective view of the example assembled hollow rotor shaft of FIG. 1.

FIG. 2 shows a perspective view of the sectional illustration, shown in FIG. 1, of an embodiment of a hollow rotor shaft 2 according to the invention with an arranged lamination assembly 6. This view shows the spheroidal design at least in sections of the cooling-medium distribution element 10, the removal region 12 of which is of spherical design. The receiving region 11 and the mounting region 14 are designed as extensions starting from the removal region 12. The discharging region 13 has a multiplicity of outlet openings 15 which are in the form of passage bores, as shown in FIGS. 1 and 2, or else in the form of elongated holes or a comparable shape.

The outlet openings 15 are advantageously distributed in the circumferential direction of the cooling-medium distribution element 10 along the wall in the discharging region 13 or in the removal region 12, wherein the discharging region 13 is formed by means of the design of the outlet openings 15. The outlet opening 15 are particularly advantageously arranged in a manner distributed in the circumferential direction at equal distances from one another, as shown in the embodiment according to FIGS. 1 and 2. However, it is also conceivable for the outlet openings 15 to be distributed nonuniformly along the circumference of the removal region 12.

Figure 3:
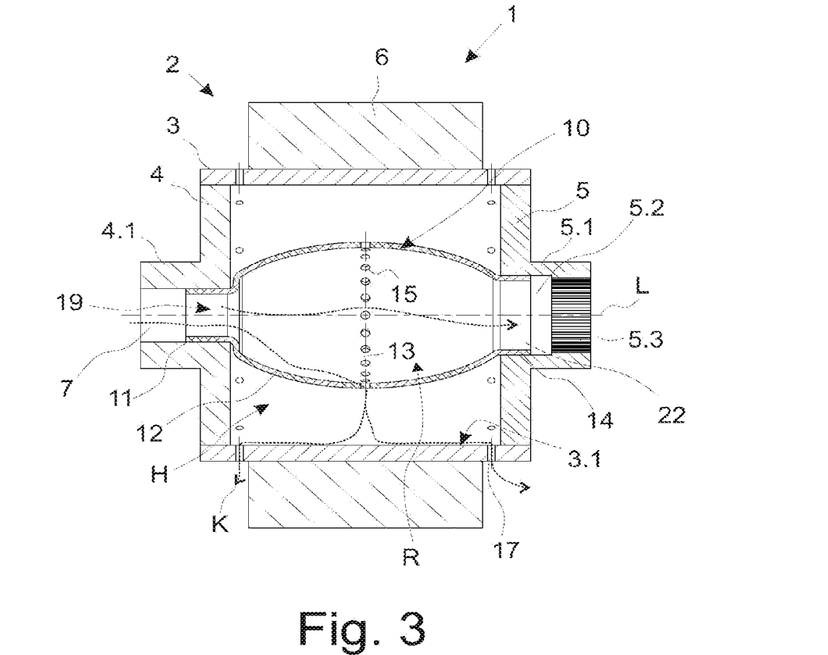
FIG. 3 is a lateral sectional view of another example assembled hollow rotor shaft, with an egg-shaped cooling-medium distribution element.
Figure 4:
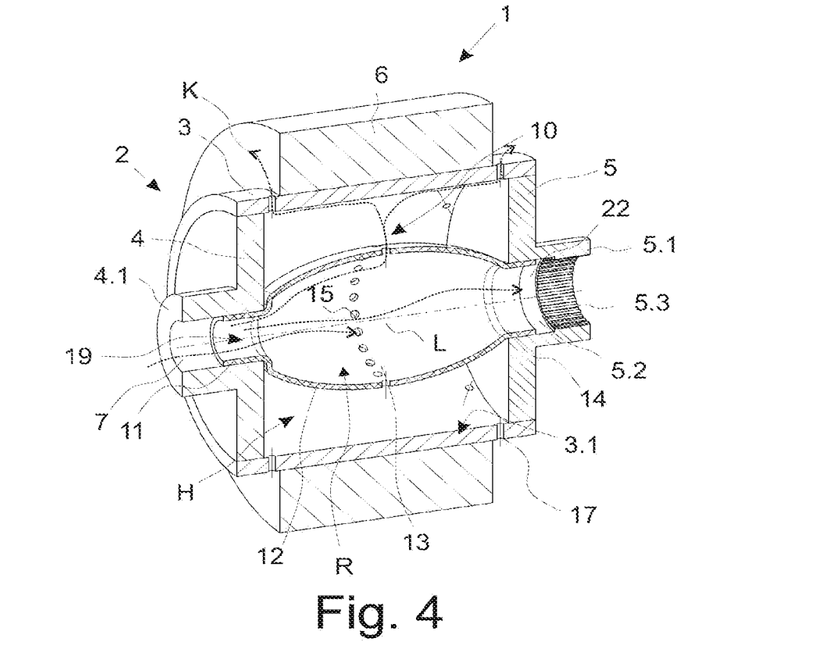
FIG. 4 is a perspective view of the example assembled hollow rotor shaft of FIG. 3.

FIGS. 3 and 4 show a further embodiment of a hollow rotor shaft 2 according to the invention. This further embodiment differs from the embodiment shown in FIGS. 1 and 2 in that the cooling-medium distribution element 10, in particular the removal region 12 of the cooling-medium distribution element 10, is designed in the form of an egg-shaped rotational body, in particular in the form of an extended rotational ellipsoid. The axis of rotation of the cooling-medium distribution element 10 corresponds here to the axis of rotation of the hollow rotor shaft 2 and consequently of the longitudinal axis L.

Furthermore, the embodiment, shown in FIGS. 3 and 4, of a hollow rotor shaft 2 according to the invention differs from the embodiment shown in FIGS. 1 and 2 in that an additional component, such as the pipe section 21 shown in FIGS. 1 and 2, is not introduced into the inlet 7. Accordingly, only one inlet channel 19 is formed, through which the cooling medium K is introduced into the cavity R of the cooling-medium distribution element 10. The cooling-medium distribution element also does not have any structures 16.

According to the embodiment of FIGS. 3 and 4, the mounting region 14 of the cooling-medium distribution element 10 has an opening through which in particular excessive cooling medium K is guided out of the cavity R of the cooling-medium distribution element 10. It is conceivable that, accordingly, the cooling medium K can be guided not only via the outlet openings 15 out of the cavity R of the cooling-medium distribution element 10 into the shaft cavity H of the hollow rotor shaft 2 and from there further via the passage openings 17 to the lamination assembly 6 or to the stator (not shown here) of the electric machine. It is also possible that, in addition, a further cooling-medium conducting path is made possible via the end flange 5, in particular via the shaft journal 5.1 of one of the end flanges. Use is advantageously made here of an end flange 4, in particular the first end flange 4 for introducing the cooling medium K into the hollow rotor shaft 2, in particular into the cooling-medium distribution element 10, while the other end flange 5, in particular the second end flange 5 serves for conducting cooling medium K out of the hollow rotor shaft 2, in particular to the cooling-medium distribution element 10. It is conceivable that the cooling medium K which is conducted out via the second end flange 5 is advantageously used for cooling the stator of the electric machine. The cooling-medium conducting path required for this purpose is not illustrated for clarity reasons.

Figure 5:
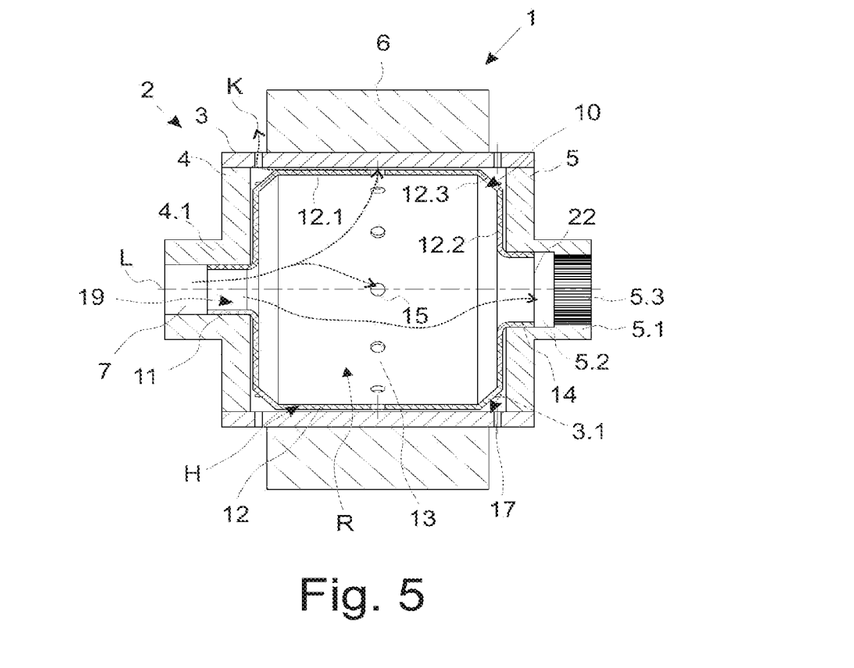
FIG. 5 is a lateral sectional view of still another example assembled hollow rotor shaft, with a circular-cylindrical cooling-medium distribution element.
Figure 6:
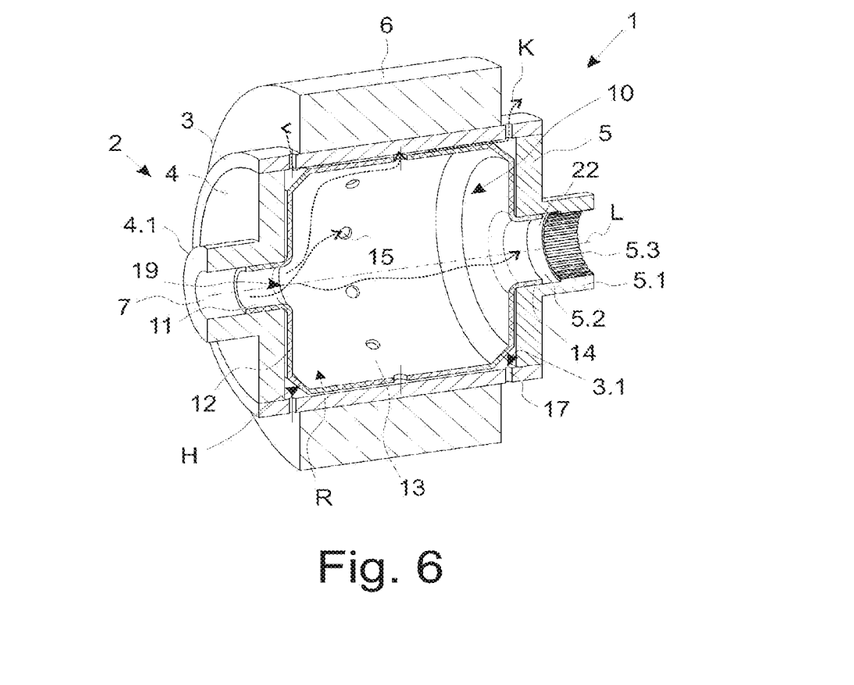
FIG. 6 is a perspective view of the example assembled hollow rotor shaft of FIG. 5.

FIGS. 5 and 6 show a further embodiment of a hollow rotor shaft 2 according to the invention which differs from the embodiment shown in FIGS. 3 and 4 to the effect that the cooling-medium distribution element 10, in particular the removal region 12, comprises an angular rotational form, in particular a cylindrical, advantageously a circular-cylindrical form. It is possible here, as shown in FIGS. 5 and 6, for a bevel 12.3 to be formed between the jacket surface 12.1 and the end surface 12.2 of the circular-cylindrical removal region 12. The cooling-medium distribution element 10 is advantageously dimensioned in such a manner that it virtually completely fills the shaft cavity H. This means that it is conceivable for the cavity R of the cooling-medium distribution element 10, in particular of the removal region 12 of the cooling-medium distribution element 10, to be larger than the remaining shaft cavity H of the hollow rotor shaft 2.

The geometrical design of the cooling-medium distribution element 10 is not limited to the geometrical forms shown in FIGS. 1 to 6. On the contrary, any geometrical form is conceivable which is suitable for permitting a uniform distribution of the cooling medium K along the inner surface 3.1 of the cylinder jacket 3. The features of the embodiments shown in FIGS. 1 to 6 can be varied among one another and are not limited to a defined embodiment. For example, it is conceivable that the pipe section 21 shown in FIGS. 1 and 2 can also be used in the case of rotor hollow shafts 2 according to the embodiment of FIGS. 3 to 6. Or it is conceivable by way of example that the mounting region 12, as shown in FIGS. 1 and 2, can likewise comprise an opening 22, as shown in FIGS. 3 to 6, wherein it is also conceivable for the mounting region 14, as shown in FIGS. 3 to 6, to be designed to be closed, i.e. not to have an opening 22.

LIST OF REFERENCE SIGNS

1 Rotor
2 Hollow rotor shaft
3 Cylinder jacket
3.1 Inner surface of the cylinder jacket
4 (First) end flange
4.1 Shaft journal
5 (Second) end flange
5.1 Shaft journal
5.2 Cutout
5.3 Toothing
6 Lamination assembly
7 Inlet
10 Cooling-medium distribution element
11 Receiving region
12 Removal region
12.1 Jacket surface
12.2 End surface
12.3 Bevel
13 Discharging region
14 Mounting region
15 Outlet opening
16 Structure
17 Passage opening 18 Bore
19 Inlet channel
20 Inlet channel
21 Pipe section
22 Opening
H Shaft cavity
K Cooling medium
L Longitudinal axis
R Cavity
S Axis of symmetry

What is claimed is:

1. An assembled hollow rotor shaft for a rotor, which rotates about a longitudinal axis, of an electric machine, the assembled hollow rotor shaft comprising:
   a cylinder jacket that surrounds a shaft cavity;
   end flanges disposed on both sides of the cylinder jacket;
   a shaft journal disposed on each of the end flanges;
   an inlet disposed in the shaft journal of one of the end flanges, via which inlet a cooling medium can be conducted into the shaft cavity and onto an inner surface of the cylinder jacket; and
   a cooling-medium distribution element disposed within the shaft cavity, the cooling-medium distribution element being symmetrical perpendicular to the longitudinal axis, wherein the cooling-medium distribution element is configured to receive the cooling medium, which enters via the inlet, via a receiving region, guide the cooling medium via a removal region in a direction of the inner surface of the cylinder jacket, and discharge the cooling medium onto the inner surface via a discharging regions;
   wherein the cooling-medium distribution element has a spheroidal design at least in some sections; and
   wherein the discharging region is disposed in the removal region halfway between the end flanges.

2. The assembled hollow rotor shaft of claim 1 wherein the cooling-medium distribution element symmetrically divides the shaft cavity.

3. The assembled hollow rotor shaft of claim 1 wherein the cooling-medium distribution element extends within the shaft cavity at least from a first of the end flanges to a second of the end flanges.

4. The assembled hollow rotor shaft of claim 1 wherein the cooling-medium distribution element comprises a mounting region by which the cooling-medium distribution element is mounted on the end flange disposed opposite the end flange with the shaft journal with the inlet.

5. The assembled hollow rotor shaft of claim 1 wherein the discharging region comprises a plurality of radial outlet openings that are disposed equidistant from one another over an extent of the cooling-medium distribution element.

6. The assembled hollow rotor shaft of claim 1 wherein an inner wall of the cooling-medium distribution element comprises a structure configured to distribute the cooling medium over of the cooling-medium distribution element.

7. The assembled hollow rotor shaft of claim 6 wherein the structure on the inner wall of the cooling-medium distribution element is convex.

8. The assembled hollow rotor shaft of claim 1 wherein the cylinder jacket comprises a passage opening that permits the cooling medium to flow in a radial direction as the hollow rotor shaft is rotating and that permits wetting of a stator surrounding the rotor.

9. The assembled hollow rotor shaft of claim 8 comprising a plurality of passage openings that are distributed equally over a circumference of the cylinder jacket.

10. The assembled hollow rotor shaft of claim 8 comprising passage openings disposed in a first edge region of the cylinder jacket, wherein the passage openings are offset with respect to one another over a circumference of the cylinder jacket relative to passage openings that are disposed in a second edge region of the cylinder jacket.

11. A rotor comprising a hollow rotor shaft, which is equipped with lamination assemblies, wherein the hollow rotor shaft comprises:
    a cylinder jacket that surrounds a shaft cavity;
    end flanges disposed on both sides of the cylinder jacket;
    a shaft journal disposed on each of the end flanges;
    an inlet disposed in the shaft journal of one of the end flanges, via which inlet a cooling medium can be conducted into the shaft cavity and onto an inner surface of the cylinder jacket; and
    a cooling-medium distribution element disposed within the shaft cavity, the cooling-medium distribution element being symmetrical perpendicular to a longitudinal axis, wherein the cooling-medium distribution element is configured to receive the cooling medium, which enters via the inlet, via a receiving region, guide the cooling medium via a removal region in a direction of the inner surface of the cylinder jacket, and discharge the cooling medium onto the inner surface via a discharging region;
    wherein the cooling-medium distribution element has a spheroidal design at least in some sections; and
    the discharging region is disposed in the removal region halfway between the end flanges.

12. An electric machine comprising an asynchronous motor or a permanently excited synchronous machine, the electric machine comprising the rotor of claim 11.

* * * * *